(12) United States Patent
Miura (10) Patent No.: US 8,220,481 B2
(45) Date of Patent: Jul. 17, 2012

(54) FUEL SHUTOFF VALVE

(75) Inventor: Natsushi Miura, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 419 days.

(21) Appl. No.: 12/585,260

(22) Filed: Sep. 10, 2009

(65) Prior Publication Data

US 2010/0065134 A1 Mar. 18, 2010

(30) Foreign Application Priority Data

Sep. 17, 2008 (JP) ................. 2008-238005
Aug. 19, 2009 (JP) ................. 2009-190132

(51) Int. Cl.
*F16K 24/04* (2006.01)
(52) U.S. Cl. ........................... 137/202; 137/43
(58) Field of Classification Search .............. 137/39, 137/43, 202, 587, 430; 141/198, 199, 216
See application file for complete search history.

(56) References Cited

U.S. PATENT DOCUMENTS

| | | | | |
|---|---|---|---|---|
| 4,982,757 A | * | 1/1991 | Ohasi et al. | 137/202 |
| 5,172,714 A | * | 12/1992 | Kobayashi et al. | 137/43 |
| 5,850,851 A | * | 12/1998 | Miura et al. | 137/583 |
| 5,954,083 A | * | 9/1999 | Hattori | 137/202 |
| 6,035,884 A | * | 3/2000 | King et al. | 137/202 |
| 6,901,943 B2 | * | 6/2005 | Yamada et al. | 137/202 |
| 6,941,966 B2 | * | 9/2005 | Mori et al. | 137/202 |
| 7,013,908 B2 | * | 3/2006 | Miyoshi et al. | 137/202 |
| 7,188,613 B2 | * | 3/2007 | Miura et al. | 137/202 |
| 7,571,740 B2 | * | 8/2009 | Kaneko et al. | 137/202 |
| 7,717,126 B2 | * | 5/2010 | Tagami et al. | 137/43 |

FOREIGN PATENT DOCUMENTS

| | | |
|---|---|---|
| JP | A-07-35255 | 2/1995 |
| JP | A-2002-21665 | 1/2002 |

* cited by examiner

*Primary Examiner* — Craig Schneider
*Assistant Examiner* — Craig J Price
(74) *Attorney, Agent, or Firm* — Posz Law Group, PLC (57) ABSTRACT

A fuel shutoff valve includes a valve chamber, a casing, a float, and a shock absorber. The casing includes a body, a cylinder, and a seal. The float is accommodated in the valve chamber. The shock absorber includes a seat attaching to and detaching from the seal of the casing. The shock absorber includes a first arm, a second arm, a contact, and a locker. The first arm protrudes outward from the seat of the shock absorber diametrically, and exhibits elasticity. The second arm exhibits elasticity. The contact is disposed at the leading end of the second arm, and comes in contact with the float. The locker is disposed at a diametrically-outer-side leading end of the first arm, and locks to the body of the casing when the shock absorber is positioned at the lowermost level in the valve chamber.

18 Claims, 9 Drawing Sheets

FUEL SHUTOFF VALVE

INCORPORATION BY REFERENCE

The present invention is based on Japanese Patent Application No. 2008-238,005, filed on Sep. 17, 2008, and on Japanese Patent Application No. 2009-190,132, filed on Aug. 19, 2009, the entire contents of which are incorporated herein by reference.

BACKGROUND OF THE INVENTION

1. Field of the Invention

The present invention relates to a fuel shutoff valve, which is to be installed to or mounted on the fuel tank of vehicle.

2. Description of the Related Art

Figure 10:
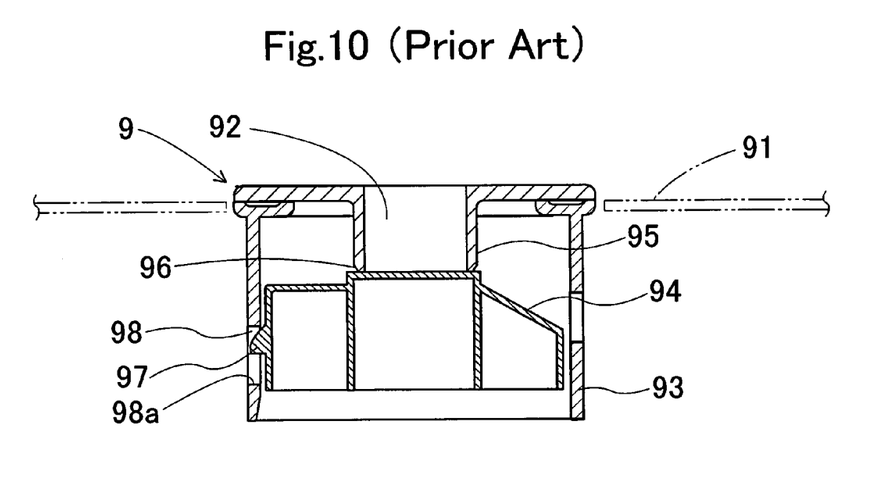
FIG. 10 illustrates a fuel shutoff valve that is directed to a conventional example, and shows that it is in the ascending operation in a cross-sectional diagram.
Figure 11:
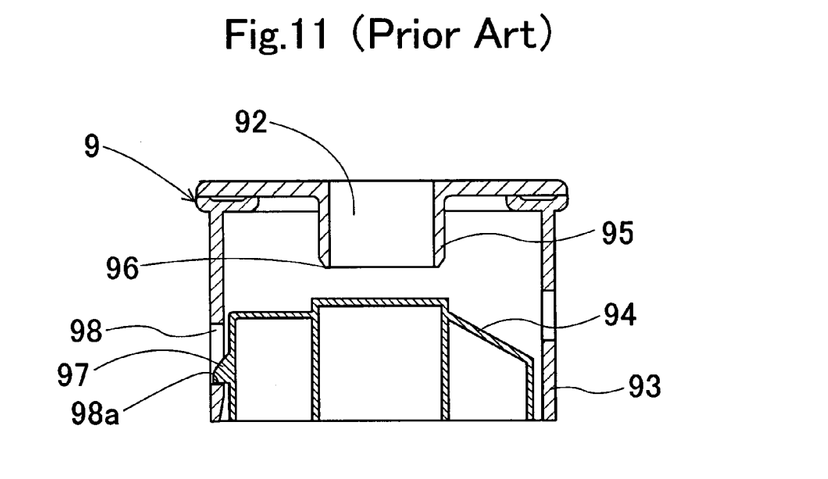
FIG. 11 illustrates the conventional fuel shutoff valve, and shows that it is in the descending operation in a cross-sectional diagram.

Within a fuel tank, a fuel shutoff valve is disposed. The fuel shutoff valve not only discharges gases that the evaporating fuel generates, but also shuts off the fuel from flowing out thorough the discharge port of the fuel tank. For example, a conventional fuel shutoff valve 9 is installed to the top of a fuel tank 91, as illustrated in FIG. 10. The conventional fuel shutoff valve 9 comprises a casing 93, and a float 94. The casing 93 is provided with a connector passage 92 on the top. The connector passage 92 is to be connected to a filled-up fuel detector, for instance. The float 94 ascends and descends, depending on a buoyant force that is exerted on it. The buoyant force results from the rise and fall of the liquid-fuel level of fuel that flows into a valve chamber within the casing 93. Moreover, an upper cylinder 95 is put in place above the float 94, and makes the connector passage 92. The ascending float 94 attaches to a seal 96 that is formed at the lower end of the upper cylinder 95. The descending float 94 detaches from the seal 96. When the liquid-fuel level within the valve chamber rises to ascend the float 94, the top wall of the float 94 makes a contact with the seal 96 to shutoff the connector passage 92. On the contrary, when the liquid-fuel level within the valve chamber falls to descend the float 94 as shown in FIG. 11, the top wall of the float 94 separates from the seal 96 to open the connector passage 92. In addition, the float 94 is provided with a claw 97 on the peripheral wall. The claw 97 projects from the peripheral wall, and is then locked to a guide hole 98 ascendably and descendably. The guide hole 98 is opened in the peripheral wall of the casing 93. Thus, the claw 97 ascends and descends while being guided by the guide hole 98. When the claw 97 comes in contact with a lower end 98a of the guide hole 98, the float 94 is inhibited from descending.

However, when the float 94 ascends to come in contact with the seal 96 of the casing 93, and when the float 94 descends to come in contact with the guide hole 98's lower end 98a, the float 94 might produce impact noises. Moreover, the impact noises might be hearable to passengers in the passenger compartment of vehicle.

Accordingly, as disclosed in Japanese Unexamined Patent Publication (KOKAI) Gazette No. 7-35,255 or Japanese Unexamined Patent Publication (KOKAI) Gazette No. 2002-21,665, the bottom of a casing has been heretofore provided with a rubber seat or an elastic arm in order to reduce the impact noises that might be generated when a float comes in contact with the casing.

However, Japanese Unexamined Patent Publication (KOKAI) Gazette No. 7-35,255 and Japanese Unexamined Patent Publication (KOKAI) Gazette No. 2002-21,665 only disclose to reduce the impact noises that the descending float might produce, but they do not at all disclose to reduce the impact noises that the ascending float might produce. Moreover, it is required to provide the casing with a floor plate in order to enable the rubber seat or elastic arm to be installed to or mounted on the casing. Consequently, the conventional fuel shutoff valves set forth in the patent publications have come to have complicated structures.

SUMMARY OF THE INVENTION

The present invention has been developed in view of such circumstances. It is therefore an object of the present invention to provide a fuel shutoff valve, which can reduce the impact noises that a float might generate not only when it descends but also when it ascends.

A first fuel shutoff valve according to the present invention is mounted on the top of fuel tank, and opens and closes a connector passage that connects the inside of the fuel tank to the outside, thereby communicating the inside of the fuel tank with the outside and shutting off the inside of the fuel tank from the outside, and comprises:

a valve chamber for communicating the connector passage with the inside of the fuel tank;

a casing comprising a body for forming the valve chamber, a cylinder being disposed on an upper side of the body and protruding into the valve chamber to form the connector passage, and a seal being disposed under the cylinder;

a float being accommodated in the valve chamber, comprising an engager, and ascending and descending within the valve chamber, depending on a buoyant force that results from a liquid-fuel level within the valve chamber to exert on the float; and a shock absorber being disposed between the seal of the casing and the float, comprising an engagee that engages with the engager of the float when the float descends at least, and a seat that attaches to and detaches from the seal of the casing, and the shock absorber ascending and descending along with the float within the valve chamber to attach and detach the seat to and from the seal, thereby closing and opening the connector passage;

the shock absorber further comprising:

the seat being disposed at a diametrically central part of the shock absorber;

the engagee being disposed on a diametrically outer side of the seat;

a first arm protruding toward a diametrically outer side of the seat, and exhibiting elasticity;

a second arm protruding from one of the first arm and the seat, having a leading end that makes a free end, and exhibiting elasticity;

a contact being disposed at the leading end of the second arm, and coming in contact with the ascending float; and a locker being disposed at a diametrically-outer-side leading end of the first arm, and locking to the body of the casing when the shock absorber is positioned at the lowermost level in the valve chamber.

The first fuel shutoff valve according to the present invention that is constructed as described above is installed to an upper side than is a predetermined liquid-fuel level that is determined within the fuel tank. When the swing of fuel or the supply of fuel causes to raise the liquid-fuel level within the fuel tank, the buoyant force that exerts on the float increases to raise the float. The float ascends along with the shock absorber while coming in contact with the shock absorber's contact. Eventually, the shock absorber's seat comes in contact with the casing's seal, thereby shutting off the connector passage.

Note herein that the shock absorber comprises the second arm. The second arm intervenes between the shock absorber's contact and seat, and exhibits elasticity. Accordingly, when the shock absorber's seat comes in contact with the casing's seal, the second arm undergoes elastic deformation to absorb impacts upon the seat coming in contact with the seal. Consequently, the first fuel shutoff valve according to the present invention can reduce impact noises that the shock absorber might produce when it comes in contact with the casing.

In the other hand, when the swing of fuel or the consumption of fuel causes to lower the liquid-fuel level within the fuel tank, the buoyant force that exerts on the float decreases to descend the float. As a result, the shock absorber's seat separates from the casing's seal to open the connector passage. Moreover, the float falls along with the shock absorber while engaging with the shock absorber's engagee at the engager. Eventually, when the shock absorber is positioned at the lowermost level within the valve chamber, the shock absorber's locker comes in contact with the casing's body. Note herein that the locker is disposed at a diametrically-outer-side leading end of the shock absorber's first arm. Accordingly, when the locker comes in contact with the body, the first arm undergoes elastic deformation to absorb impacts upon the locker coming in contact with the body. Consequently, the first fuel shutoff valve according to the present invention can reduce impact noises that the shock absorber might produce when it comes in contact with the casing.

As described above, the first fuel shutoff valve according to the present invention can reduce impact noises that might occur on both occasions, namely, when the float ascends to come in contact with the casing and when the float descends to come in contact with the casing.

Moreover, it is preferable that the first fuel shutoff valve according to the present invention can be constructed optionally so that the shock absorber can further comprise a top wall having an upper surface and a lower surface; the upper surface of the top wall can make the seat; and the top wall can make: the contact that projects from the lower surface of the top wall and is disposed at the diametrically-outer-side leading end of the second arm; the second arm that undergoes upward elastic deformation when the ascending float comes in contact with the contact; and the first arm that undergoes downward elastic deformation when the descending float locks the locker of the shock absorber to the body of the casing.

In the first fuel shutoff valve according to the present invention that is constructed preferably as described above, the second arm deforms upward elastically when the float ascends to eventually come in contact with the contact of the shock absorber. On the contrary, when the float descends to eventually lock the locker of the shock absorber to the body of the casing, the first arm deforms downward elastically. Consequently, the thus constructed preferable present first fuel shutoff valve can more reliably reduce impact noises that the float might produce not only when it has descended fully but also when it has ascended fully.

In addition, it is more preferable that the first fuel shutoff valve according to the present invention can be optionally constructed so that the first arm can be provided with the locker at a leading end thereof; the body of the casing can be provided with a side wall that has a guide hole for guiding the ascending and descending locker; and the locker can lock to a lower end of the guide hole of the body when the shock absorber is positioned at the lowermost level in the valve chamber.

In the first fuel shutoff valve according to the present invention that is constructed more preferably as described above, the locker of the shock absorber ascends and descends while being locked to the guide hole that the body of the casing is provided with. Therefore, the thus constructed more-preferable present first fuel shutoff valve can keep holding the shock absorber precisely at a predetermined position within the valve chamber.

In the first fuel shutoff valve that is constructed preferably as described above, it is further preferable that the first arm can protrude as a framed shape toward a diametrically outer side of the seat; and the first arm can surround the second arm by way of a slit that is provided between the first arm and the second arm.

If such is the case, the first arm, and the second arm can flex at independent timings. Specifically, the contact makes contact with the float, which has ascended fully, so that it becomes likely that the second arm flexes. Moreover, the engagee engages with the float, which has descended fully, so that it becomes likely that the first arm flexes. Moreover, the setting makes it possible to lay out the first arm and second arm in minor spaces efficiently.

In the first fuel shutoff valve that is constructed preferably as described above, it is further preferable that the first arm can be provided with an extension that faces the body of the casing and can extend in an ascending/descending direction of the shock absorber; the extension can have a base end that is connected to the diametrically-outer-side leading end of the first arm that the top wall of the shock absorber makes; and the extension can have a leading end that makes a free end and is provided with the locker. On this occasion, it becomes likely that the first arm flexes when the float has fully descended.

Moreover, it is preferable that the first fuel shutoff valve according to the present invention can be constructed optionally so that the second arm can have a base end that is connected to the seat, and the leading end that extends outward diametrically. On this occasion, it becomes likely that the second arm flexes when the float has fully ascended.

A second fuel shutoff valve according to the present invention is mounted on the top of fuel tank, and opens and closes a connector passage that connects the inside of the fuel tank to the outside, thereby communicating the inside of the fuel tank with the outside and shutting off the inside of the fuel tank from the outside, and comprises:

a valve chamber for communicating the connector passage with the inside of the fuel tank;

a casing comprising a body for forming the valve chamber, a cylinder being disposed on an upper side of the body and protruding into the valve chamber to form the connector passage, and a seal being disposed under the cylinder;

a float comprising a seat that attaches to and detaches from the seal of the casing, and an engager, and ascending and descending within the valve chamber, depending on a buoyant force that results from a liquid-fuel level within the valve chamber to exert on the float, thereby attaching the seat to and detaching the seat from the seal of the casing to close and open the connector passage; and a shock absorber being disposed between the seal of the casing and the float, and being retained to the body of the casing;

the shock absorber comprising:

a through hole opening at a diametrically central part of the shock absorber, thereby enabling the seat of the float to advance and retract therein;

a first arm protruding from a peripheral end of the through hole toward a diametrically outer side of the seat, and exhibiting elasticity;

a second arm protruding from one of the first arm and the through hole, having a leading end that makes a free end, and exhibiting elasticity;

a contact being disposed at the leading end of the second arm, and attaching to and detaching from the float;

a locker being disposed at a diametrically-outer-side leading end of the first arm, and locking to the body of the casing; and an engagee being disposed on a diametrically outer side with respect to the through hole, and engaging with and disengaging from the engager of the float.

In the second fuel shutoff valve according to the present invention with the above-described construction, the float ascends because the buoyant force that exerts on the float increases when the liquid-fuel level within the fuel tank rises. Then, the float comes in contact with the contact of the shock absorber. As a result, the second arm of the shock absorber undergoes elastic deformation, because the second arm is provided with the contact at the diametrically-outer-side leading end. Thus, the elastically-deforming second arm absorbs impacts that the float exerts when it comes in contact with the shock absorber.

The float ascends furthermore while deforming the second arm of the shock absorber elastically. Eventually, the seat of the float comes in contact with the seal of the casing to close the connector passage. Note herein that the float ascends with a controlled speed because of the restoring force that the second arm exerts. Accordingly, the seat comes in contact with the seal with a controlled speed as well. Consequently, it is possible for the shock absorber to reduce impact noises, which the seat of the float might produce when the seat comes in contact with the seal of the casing, more than a shock absorber that has no second arm does.

On the contrary, when the liquid-fuel level within the valve chamber falls, the buoyant force that acts on the float decreases to descend the float. Thus, the seat of the float separates from the seal of the casing to open the connector passage. Eventually, the descending float engages with the engagee of the shock absorber at the engager. As a result, the descending float presses the shock absorber at around the engagee. Then, the first arm of the shock absorber undergoes elastic deformation. The elastically-deforming first arm absorbs impacts that the float exerts upon engaging with the engagee of the shock absorber. Therefore, it is possible for the second fuel shutoff valve according to the present invention to reduce impact noises that the float might produce at the time of descending.

As described above, it is possible for the second fuel shutoff valve according to the present invention to reduce impact noises that the float might produce under both of the following circumstances; not only upon the ascending float coming in contact with the casing but also upon the descending float coming in contact with the shock absorber that the casing retains.

Moreover, the second fuel shutoff valve according to the present invention can be constructed optionally as follows: the shock absorber can preferably further comprise a top wall having an upper surface and a lower surface; the top wall can preferably make: the contact that projects from the lower surface of the top wall and is disposed at the diametrically-outer-side leading end of the second arm; the second arm that undergoes upward elastic deformation when the ascending float comes in contact with the contact; and the first arm that undergoes downward elastic deformation when the engagee of the shock absorber engages with the engager of the descending float.

The second fuel shutoff valve according to the present invention that is constructed preferably as described above operates as hereinafter described. Upon the ascending float coming in contact with the contact of the shock absorber eventually, the second arm of the shock absorber deforms upward elastically. Accordingly, the second arm exerts the downward restoring force on the float so that the float comes in contact with the contact with a controlled ascending speed. Consequently, the seat of the float exerts reduced impacts on the seal of the casing when the seat comes in contact with the seal.

On the contrary, upon the descending float engaging with the engagee of the shock absorber at the engager eventually, the first arm of the shock absorber deforms downward elastically. As a result, in the second fuel shutoff valve according to the present invention that is constructed preferably as described above, the first arm makes it possible to more reliably reduce impact noises that might occur between the descending float and the shock absorber.

In addition, the second fuel shutoff valve according to the present invention can be optionally constructed as hereinafter described. Specifically, the first arm can more preferably be provided with the locker at a leading end thereof; and the body of the casing can more preferably comprise a side wall that has a dent for locking to the locker of the shock absorber. In the second fuel shutoff valve according to the present invention that is thus constructed more preferably, the locker and the dent make it possible to retain the shock absorber to the body of the casing more stably. Note herein that the term, "dent," means not only hollows or depressions but also holes or bores that are made in the side wall of the casing's body.

In the second fuel shutoff valve that is constructed preferably as described above, it is further preferable that the first arm can protrude as a framed shape toward a diametrically outer side of the seat; and the first arm can surround the second arm by way of a slit that is provided between the first arm and the second arm.

If such is the case, the first arm, and the second arm can flex at independent timings. Specifically, the contact makes contact with the float, which has ascended fully, so that it becomes likely that the second arm flexes. Moreover, the engagee engages with the float, which has descended fully, so that it becomes likely that the first arm flexes. Moreover, the setting makes it possible to lay out the first arm and second arm in minor spaces efficiently.

In the second fuel shutoff valve that is constructed preferably as described above, it is further preferable that the first arm can be provided with an extension that faces the body of the casing and can extend in an ascending/descending direction of the shock absorber; the extension can have a base end that is connected to the diametrically-outer-side leading end of the first arm that the top wall of the shock absorber makes; and the extension can have a leading end that makes a free end and is provided with the locker. On this occasion, it becomes likely that the first arm flexes, because the engagee engages with the float when the float has fully descended.

Moreover, it is preferable that the first fuel shutoff valve according to the present invention can be constructed optionally so that the second arm can have a base end that is connected to the seat, and the leading end that extends outward diametrically. On this occasion, it becomes likely that the second arm flexes when the float has fully ascended.

All in all, the first and second fuel shutoff valves according to the present invention comprises the shock absorber that is provided with the first arm, and the second arm. The second arm undergoes elastic deformation when the float ascends. The first arm undergoes elastic deformation when the float descends. Therefore, the second arm enables the present first and second fuel shutoff valves to reduce impact noises that the ascending float might produce. The first arm enables the present first and second fuel shutoff valves to reduce impact noises that the descending float might produce.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

EXAMPLES

Example No. 1

Figure 1:
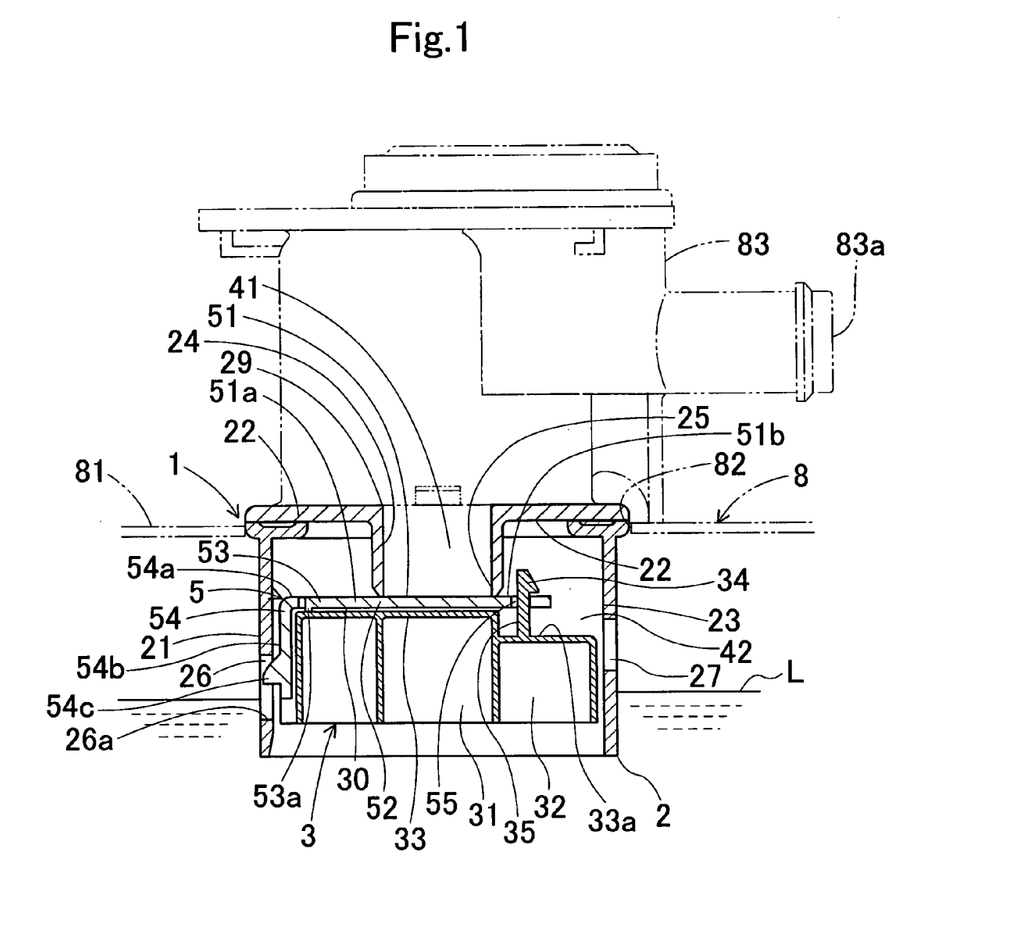
FIG. 1 illustrates a fuel shutoff valve that is directed to Example No. 1 according to the present invention, and shows that it is in the ascending operation in a cross-sectional diagram that is taken in the directions of arrows "1"-"1" designated in FIG. 2.

A fuel shutoff valve that is directed to Example No. 1 according to the present invention will be hereinafter described in detail with reference to the drawings. As illustrated in FIG. 1, a fuel shutoff valve 1 is mounted on the top of a fuel tank 8. Specifically, the fuel tank 8 has a top wall 81 that is provided with an installation hole 82. The fuel shutoff valve 1 is inserted into the installation hole 82, and is fastened to the top wall 81 that makes the peripheral end of the installation hole 82. Moreover, a filled-up fuel detector 83 is disposed on the top of the fuel shutoff valve 1. The fuel shutoff valve 1 comprises a connector passage 41 that connects the inside of the fuel tank 8 to the filled-up fuel detector 83. In addition, the filled-up fuel detector 83 has a passage 83a through which it is connected to an outside canister. When the inclination or swing of vehicle raises the liquid level "L" of fuel, which is reserved in the fuel tank 8, to a predetermined level, the fuel shutoff valve 1 closes the connector passage 41 to inhibit the fuel from flowing out to the canister that is mounted outside the fuel tank 8.

The fuel shutoff valve 1 further comprises a casing 2, a float 3, and a shock absorber 5. All of the casing 2, float 3 and shock absorber 5 are manufactured from resinous material by injection molding.

The casing 2 comprises a cylindrical side wall 21, and a lid 22 that covers the top of the side wall 21. Note that the side wall 21 and lid 22 make a body 23 of the casing 2. The space that the body 23 surrounds forms a valve chamber 42. The side wall 21 has four guide holes 26, and a ventilation hole 27. The guide holes 26 are opened in the side wall 21 at four locations that are placed at equal intervals in the peripheral direction of the side wall 21. The ventilation hole 27 communicates the valve chamber 42 with the fuel tank 8. Note that the guide holes 26 make a slot, which extends in the up/down direction of the side wall 21, respectively.

Moreover, the filled-up fuel detector 8 is put in place on the lid 22. The lid 22 is provided with an opening 29, and a cylinder 24. The opening 29 is opened at the central part of the lid 22. The cylinder 24 protrudes downward from the peripheral end of the opening 29. The inside of the cylinder 24 makes the connector passage 41. Thus, the connector passage 41 communicates with the filled-up fuel detector 83. The cylinder 24 is provided with a seal 25 at the lower leading end entirely over the peripheral direction. The connector passage 41 communicates with the valve chamber 42 by way of the seal 25. The valve chamber 42 is opened at the bottom, and is thereby communicated with the inside of the fuel tank 8. Therefore, the fuel, which is reserved in the fuel tank 8, flows into the valve chamber 42.

Figure 2:
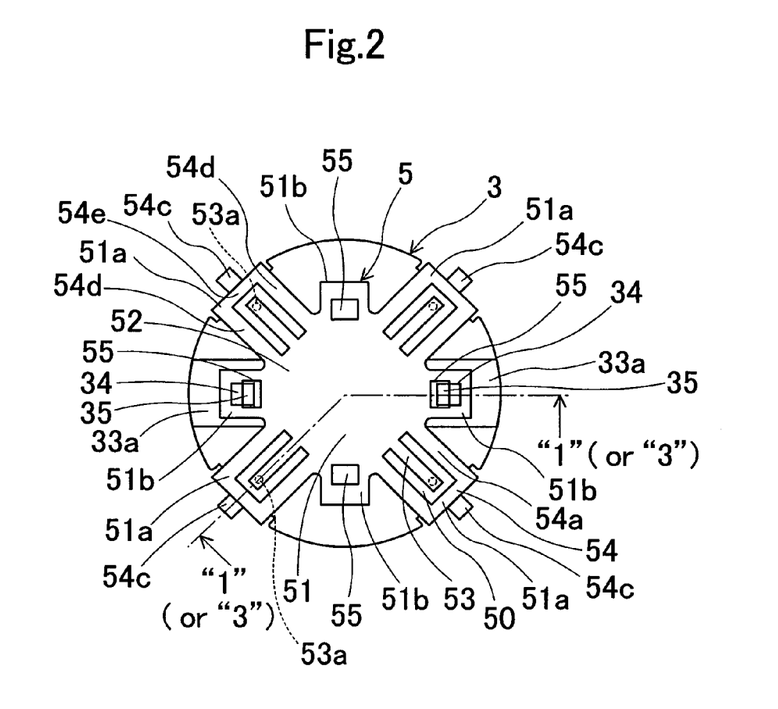
FIG. 2 illustrates a shock absorber and a float that make the present fuel shutoff valve that is directed to Example No. 1, and shows them in a plan-view diagram.

As illustrated in FIG. 1, the float 3 is formed as a bottomed dual cylindrical body, and comprises a central space 31 and an outer peripheral space 32. The central space 31 is for producing a buoyant force at the central section of the float 3. The outer peripheral space 32 is for producing a buoyant force at the outer peripheral section of the float 3. As shown in FIGS. 1 and 2, the float 3 has a top wall 33. Moreover, as illustrated in FIG. 2, the top wall 33 is provided with two indentations 33a that are placed above the outer peripheral space 32. The indentations 33a are provided with a protrusion 35, respectively. As shown in FIG. 1, the protrusions 35 have a hook 34 at the leading end, respectively.

The shock absorber 5 comprises a top wall 51. As illustrated in FIG. 1, the top wall 51 faces the lid 22 of the casing 2. Moreover, as shown in FIG. 2, the top wall 51 is formed as a flat plate shape at the central part. The top wall 51 faces the connector passage 41 at the central part as illustrated in FIG. 1. In addition, the periphery of the top wall 51's central part is provided with a seat 52 that attaches to and detaches from the seal 25 of the casing 2. As shown in FIG. 2, the top wall 51 has four major arms 51a, and four minor arms 51b. The major arms 51a and minor arms 51b protrude radially from the seat 52 toward a diametrically outer side, respectively. The four major arms 51a are put in place at equal intervals to each other. The four minor arms 52a are put in place in the middle between the two major arms 51a.

As illustrated in FIG. 2, each of the major arms 51a is provided with a second arm 53, and a first arm 54. The second arm 53 protrudes from the seat 52 toward a diametrically outer side, and the leading end makes a free end. The first arm 54 protrudes from the seat 52 toward a diametrically outer side and then back toward a diametrically inner side so as to go around the second arm 53. Thus, a slit 50 intervenes between the second arm 53 and the first arm 54. That is, the second arm 53 and the first arm 54 are free of contact to each other.

The first arm 54 comprises first paired linear sections 54d, 54d, and a second linear section 54e. The first paired linear sections 54d, 54d extend diametrically, and face each other. The second linear section 54e is connected to a diametrically outer side of the first paired linear sections 54d, 54d. The first arm 54 makes a rectangular frame that opens in the periphery of the seat 52. The frame-shaped first arm 54 surrounds the second arm 53. The base end of the second arm 53 is connected to the seat 52. The second arm 53 extends from the base end outward diametrically, and parallels the first paired linear sections 54d, 54d of the first arm 54.

The second arm 53 makes a plate spring, which undergoes elastic deformation in the up/down direction, as a whole, because the base end is connected to the seat 52 and the leading end makes a free end. The second arm 53 is provided with a contact 53a on the lower surface at the leading end. The contact 53a projects from the lower surface of the second arm 53, and comes in contact with the top wall 33 of the float 3.

As illustrated in FIGS. 1 and 2, the first arm 54 is provided with a top wall 54a, and a side wall 54b. As shown in FIG. 2, the top wall 54a extends up to the outer periphery of the float 3. As illustrated in FIG. 1, the side wall 54b, which is equivalent to the claimed "extension" that is directed to the present fuel shutoff valve, faces the side wall of the casing 2's body 23, and extends in the ascending/descending direction of the shock absorber 5. The base end of the side wall 54b, i.e., the top, is connected to the top wall 54a, and the lower leading end of the side wall 54b, i.e., the bottom, makes a free end. The top wall 54a is connected to the seat 52 at the base end and is connected to the side wall 54b at the leading end, thereby making a plate spring that undergoes elastic deformation in the up/down direction. The sidewall 54b is connected to the top wall 54a at the top, and makes a leading end at the lower end. The side wall 54b moves in the up/down direction, and the thus moving side wall 54b deforms the top wall 54a elastically in the up/down direction. The side wall 54b is provided with a claw-shaped locker 54c on the outer peripheral surface. The locker 54c locks to the guide hole 26 of the casing 2's body 23, as shown in FIG. 1. The locker 54c can move within the guide hole 26 in the up/down direction. Moreover, the locker 54c, which locks to the lower end 26a of the guide hole 26, determines the lowermost position of the shock absorber 5.

In other words, it is possible to say that the second arm 53 and first arm 54 make an overhang that protrudes from the seat 52 toward the diametrically outer side, and which exhibits elasticity, for instance.

As illustrated in FIG. 2, four minor arms 51b have an opening 55, respectively. Of two of the four openings 55 that the four minor arms 51b are provided with, namely, the two openings 55 that are put in place at positions facing horizontally in the drawing, make engagees. That is, the two openings 55 engage with the hooks 34 (i.e., engagers) of the float 3's protrusions 35 that protrude upward from the top wall 33 of the float 3. Moreover, the two openings 55, and the float 3's two protrusions 35, which are inserted into the two openings 55, position the seat 52 at the diametrically central part of the shock absorber 5. The shock absorber 5 provides a clearance 30 between itself and the top wall 33 of the float 3, as shown in FIG. 1. Note that the clearance 30 is provided securely in both of the following cases: namely, when the top wall 33 of the float 3 comes in contact with the contacts 53a of the shock absorber 5 during the ascent of the float 6; and when the hooks 34 of the float 3's protrusions 35 engage with the openings 55 of the shock absorber 5 during the descent of the float 6.

Hereinafter, how the fuel shutoff valve 1 operates will be described in detail. As illustrated in FIG. 1, when the fuel flows into the valve chamber 42 of the fuel shutoff valve 1 because of the fuel that swings in the fuel tank 8, or because of the supply of the fuel, then the liquid-fuel level "L" rises. As a result, the buoyant force that exerts on the float 3 increases because the central space 31 and outer peripheral space 32 of the float 3 have been filled with the fuel vapor. The increasing buoyant force raises the float 3, and then the float 3 comes in contact with the contacts 53a of the shock absorber 5 that is put in place above the float 3. Accordingly, the float 3 ascends together with the shock absorber 3 within the valve chamber 4. Eventually, the seat 52 of the shock absorber 5 comes in contact with the seal 25 that is formed at the lower leading end of the casing 2's cylinder 24. Consequently, the seat 52 closes the connector passage 41.

Note herein that the contact 53a is disposed at the leading end of each of the second arms 53 that exhibit elasticity, and that the seat 52 is put in place on the base-end side of each of the second arms 53. Accordingly, when the ascending float 3 comes in contact with the contacts 53a, the float 3 deforms the second arms 53 upward elastically. Consequently, the second arms 53 absorb impacts when the seat 52 of the shock absorber 5 comes in contact with the seal 25 of the casing 2, thereby reducing impact noises.

Figure 3:
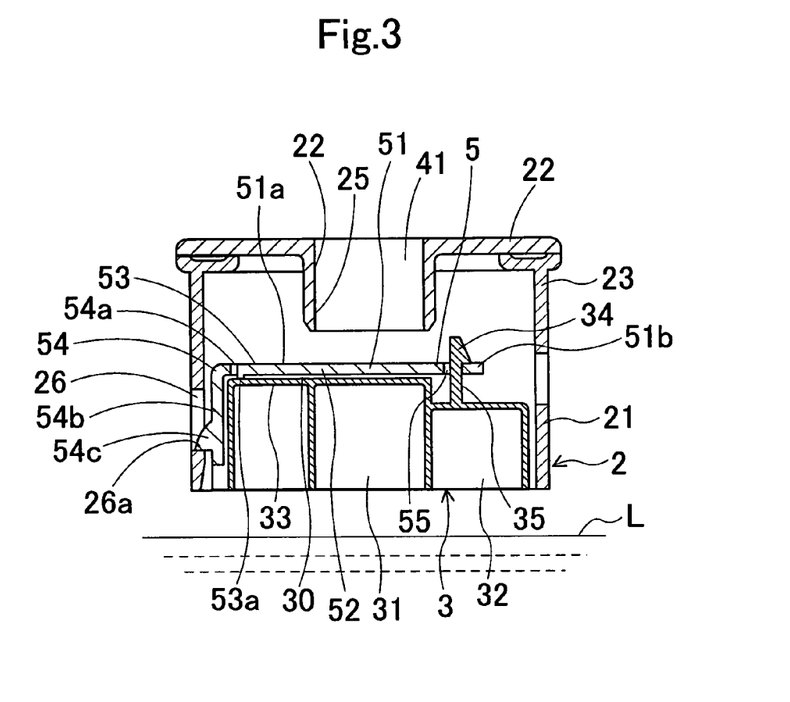
FIG. 3 illustrates the present fuel shutoff valve that is directed to Example No. 1, and shows that it is in the descending operation in a cross-sectional diagram that is taken in the directions of arrows "3"-"3" designated in FIG. 2.

On the contrary, as illustrated in FIG. 3, when the swing or consumption of the fuel causes the liquid-fuel level "L" within the valve chamber 42 to fall, the buoyant force that acts on the float 3 decreases. As a result, the float 3 descends within the valve chamber 42. The float 3 descends together with the shock absorber 5 because its hooks 34 engage with the shock absorber 5's openings 55. Thus, the seat 52, which is disposed on the top of the shock absorber 5, separates from the seal 25 of the casing 2, and thereby the connector passage 41 opens.

Moreover, when the shock absorber 5 descends more together with the float 3, each of the lockers 54c, with which the side wall 54b of the first arms 54 is provided at around the leading end, locks to the lower end 26a of each of the guide holes 26, which are opened in the side wall 21 of the casing 2. Thus, the shock absorber 5 stops descending. In addition, the float 3, which is fastened to the shock absorber 5, stops descending as well.

Note herein that each of the lockers 54c is disposed at around the leading end of each of the first arms 54. Specifically, each of the lockers 54c is disposed at around the free end of the side wall 54b of each of the first arms 54 that exhibit elasticity. Moreover, the top wall 51 of the shock absorber 5 is provided with the two minor arms 51b, which are provided with the openings 55 that engage with the hooks 34 of the float 3's protrusions 35, on the outer periphery. Specifically, as illustrated in FIG. 2, the two minor arms 51b are disposed on the horizontally-facing two parts of the top wall 51's outer periphery that make the ends or roots of the two first arms 54, which are placed apart from each other radially by 90 deg. approximately. Accordingly, the hooks 34 of the descending float 3 press the shock absorber 5 downward at around the outer periphery of the openings 55. That is, the two minor arms 51b undergo downward elastic deformation and then cause the first arms 54 to deform downward elastically. Then, the first arms 54, which undergo downward elastic deformation, absorb impacts that the shock absorber 5 produces when the lockers 54c come in contact with the lower end 26a of the guide holes 26 of the casing 2's body 23. Consequently, the thus elastically deforming first arms 54 reduce impact noises that might arise when the lockers 54c lock to the lower end 26a of the guide holes 26.

As described above, the fuel shutoff valve 1 according to Example No. 1 of the present invention comprises the shock absorber 5 that has the second arms 53 and the first arms 54. The second arms 53 undergo elastic deformation when the float 3 ascends. On the contrary, the first arms 54 undergo elastic deformation when the float 3 descends. Therefore, the present fuel shutoff valve 1 according to Example No. 1 can reduce impact noises not only when the float 3 fully descends but also when it fully ascends.

Example No. 2

Figure 4:
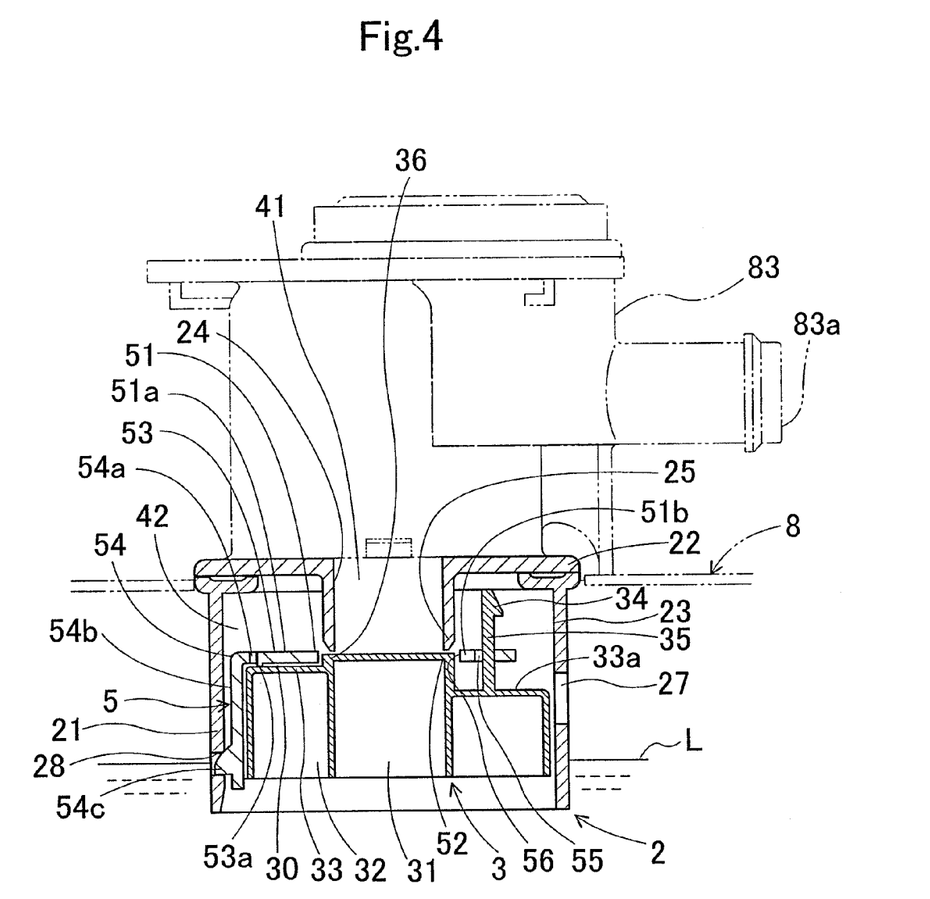
FIG. 4 illustrates a fuel shutoff valve that is directed to Example No. 2 according to the present invention, and shows that a float comes in contact with a shock absorber's contact in a cross-sectional diagram that is taken in the directions of arrows "4"-"4" designated in FIG. 5.

A fuel shutoff valve 1 according to Example No. 2 of the present invention is distinct from the present fuel shutoff valve 1 according to Example No. 1 in that a shock absorber 5 is retained to a casing 2, as shown in FIG. 4.

Figure 5:
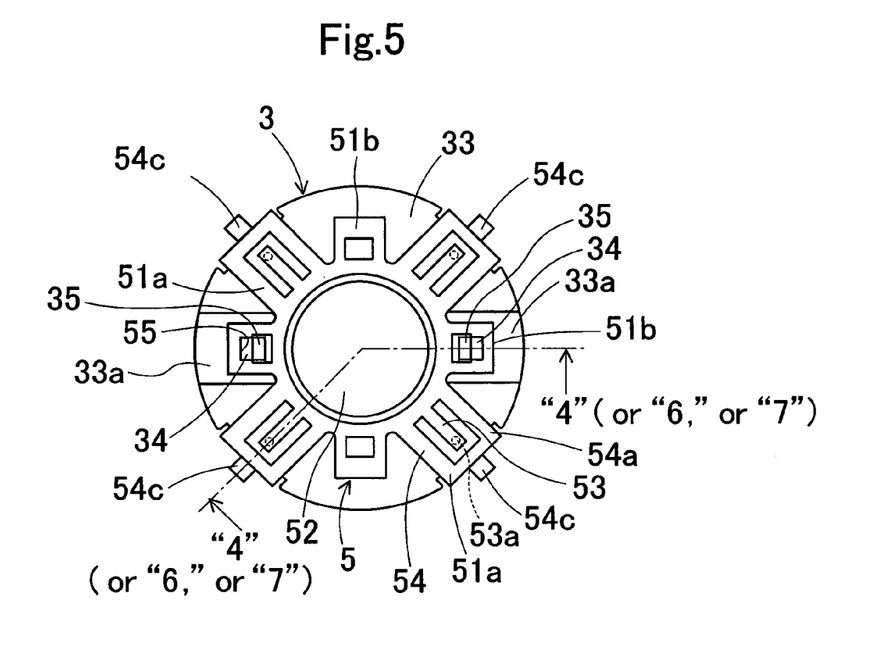
FIG. 5 illustrates the float and shock absorber that make the present fuel shutoff valve that is directed to Example No. 2, and shows them in a plan-view diagram.

As illustrated FIG. 5, a shock absorber 5 that is directed to the fuel shutoff valve according to Example No. 2 of the present invention comprises second arms 53, contacts 53a, first arms 54, lockers 54c, and openings 55, in the same manner as the shock absorber 5 that is directed to the fuel shutoff valve 1 according to Example No. 1 of the present invention. However, as can be appreciated from FIG. 4, the lockers 54c lock to holes 28 that are formed in a side wall 21 of a casing 2's body 23. Contrary to the guide holes 26 of the casing 2 that are directed to the present fuel shutoff valve according to Example No. 1, the holes 28 lock the lockers 54c to retain thereat without ever allowing the lockers 54c to ascend and descend. Moreover, as can be seen from FIGS. 4 and 5, a float 3 has two protrusions 35. The protrusions 35 protrude upward from the float 3's top wall 33, and then fit into the openings 55 of the shock absorber 5 movably up and down. In addition, the protrusions 35 are provided with a hook 34 at the leading end, respectively. The hooks 34 lock to the openings 55 at around the outer periphery when the float 3 descends to be placed at the lowermost position.

As illustrated in FIG. 4, a top wall 51 of the shock absorber 5 is provided with a through hole 56 at around the central part. On the other hand, a float 3 comprises the top wall 33, and a seat 36. The seat 36 protrudes upward slightly from the top wall 33. The shock absorber 5's through hole 56 opens somewhat greater than is the outside diameter of the float 3's seat 36 so as to enable the seat 36 to advance and retract therein.

Operations of the fuel shutoff valve according to Example No. 2 of the present invention will be hereinafter described. As illustrated in FIG. 4, the rising fuel-liquid level "L" within a valve chamber 42 raises the float 3. Then, the float 3 comes in contact with the contacts 53a of the shock absorber 5. On this occasion, a clearance 30 intervenes between the shock absorber 5's second arms 53 and the float 3's top wall 33. Therefore, the second arms 53 deform to absorb impacts that occur when the float 3 comes in contact with the contacts 53a, because the second arms 53, which exhibit elasticity, are provided with the contact 53a at the leading end, respectively.

Figure 6:
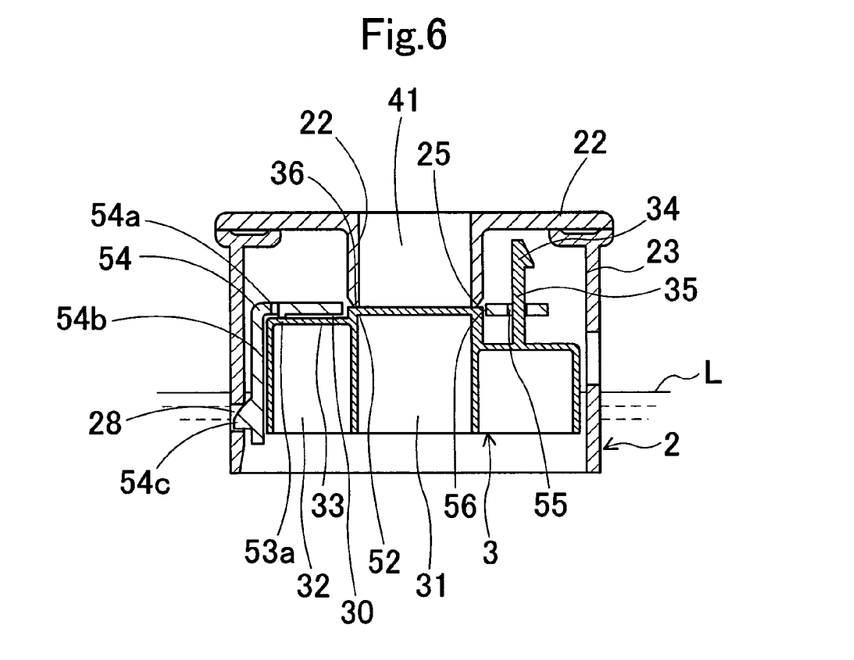
FIG. 6 illustrates the present fuel shutoff valve that is directed to Example No. 2, and shows that it is in the ascending operation in a cross-sectional diagram that is taken in the directions of arrows "6"-"6" designated in FIG. 5.

Thereafter, as illustrated in FIG. 6, the float 3 ascends more upward while elastically deforming the second arms 53 more upward. That is, the restoring force of the second arms 53 controls the float 3's ascending speed while the float 3 is ascending. Eventually, the float 3's seat 36 comes in contact with the casing 2's seal 25 to close a connector passage 41. Thus, contrary to shock absorbers that are free from the second arms 53, it is possible to reduce impact noises that might arise when the seat 36 contacts with the seal 25, because the seat 36 comes in contact with the seal 25 with a controlled speed.

Figure 7:
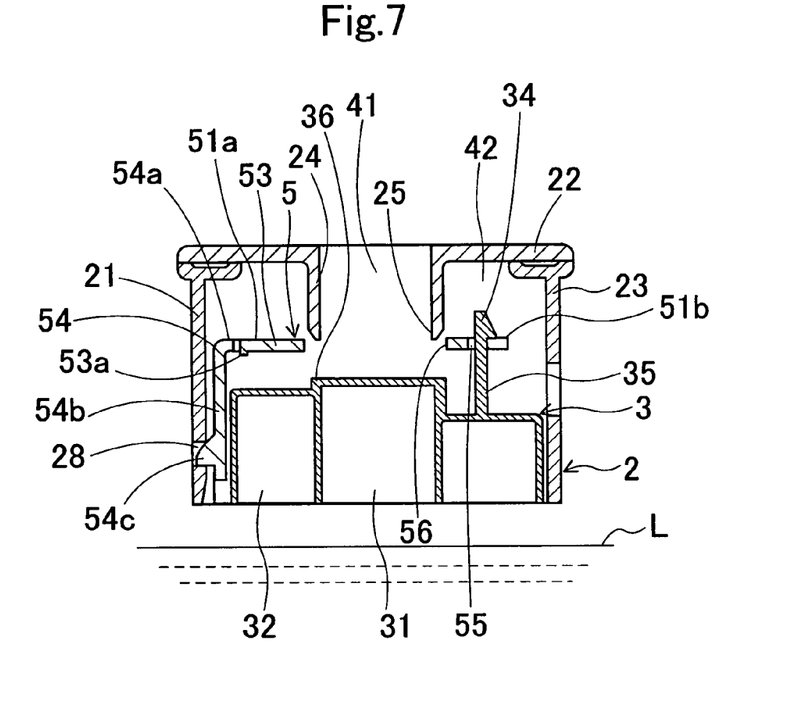
FIG. 7 illustrates the present fuel shutoff valve that is directed to Example No. 2, and shows that it is in the descending operation in a cross-sectional diagram that is taken in the directions of arrows "7"-"7" designated in FIG. 5.

On the other hand, as illustrated in FIG. 7, the falling fuel-liquid level "L" within the valve chamber 42 lowers the float 3. Then, the float 3's seat 36 separates from the casing 2's seal 25 to open the connector passage 41. Eventually, the float 3's hooks 34, which are disposed at the leading end of the protrusions 35 that protrude from the float 3' stop wall 33, engage with the outer periphery of the shock absorber 5's openings 55. Thus, the float 3 stops descending. Note herein that the two of the minor arms 51b, which protrude from the outer periphery of the through hole 56 in the right/left direction in FIG. 5, are provided with the openings 55, as shown in the drawing. Moreover, the minor arms 51b are connected to the neighboring first arms 54, which exhibit elasticity, at their end or root. Accordingly, the descending float 3 presses the minor arms 51b downward at around the outer periphery of the openings 55. As a result, the thus downwardly deforming minor arms 51b deform the first arms 54 downward elastically. Then, the thus downwardly deforming first arms 54 absorb impacts that arise when the hooks 34 engage with the openings 55. Consequently, the fuel shutoff valve according to Example No. 2 of the present invention can reduce impact noises that might occur when the descending float 3 comes in contact with the shock absorber 5.

Example No. 3

Figure 8:
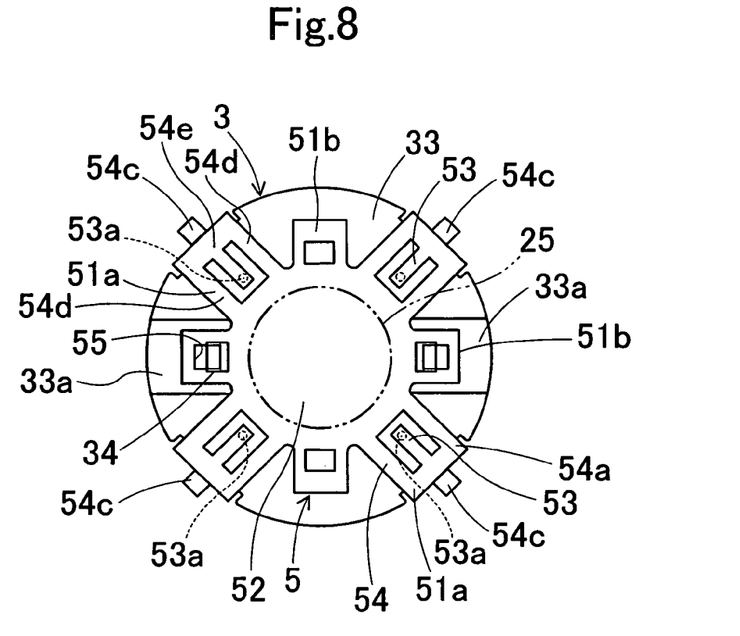
FIG. 8 illustrates a float and shock absorber that make a fuel shutoff valve that is directed to Example No. 3 according to the present invention.

A fuel shutoff valve according to Example No. 3 of the present invention is distinct from the present fuel shutoff valve according to Example No. 1 in that the layout of the second arms 53 is set differently. As illustrated in FIG. 8, the respective second arms 53 are connected at the base end to one of the inner side surfaces of the respective first arms 54 that is adjacent to the side wall of the casing 2's body 23. Specifically, the respective first arms 54 are provided with first paired linear sections 54d, 54d, which extend diametrically and faces each other, and a second linear section 54e, which extends circumferentially to connect the first paired linear sections 54d, 54d at their diametrically outer ends. The first paired linear sections 54d, 54d, and the second section 54e make the rectangular frame shape of the respective first arms 54, rectangular frame shape which opens in the periphery of the seat 52. The base end of the respective second arms 53 is connected to the second paired linear section 54e. The second arms 53 extend linearly from the base end toward the diametrically inner side. The leading end of the respective second arms 53 makes a free end that is provided with the contact 53a, which protrudes downward therefrom, on the bottom surface. The other constructions of the present fuel shutoff valve according to Example No. 3 are the same as those of the present fuel shutoff valve according to Example No. 1.

The present fuel shutoff valve according to Example No. 3's second arms 53 operate in the same manner as those of the present fuel shutoff valve according to Example No. 1. That is, when the float 3 ascends to come in contact with the contact 53a of the shock absorber 5's second arms 53. Then, the float 3 deforms the second arms 53 upward elastically. Thus, the present fuel shutoff valve according to Example No. 3 reduces impact noises that might occur when the shock absorber S's seat 52 comes in contact with the casing 2's seal 25.

Example No. 4

Figure 9:
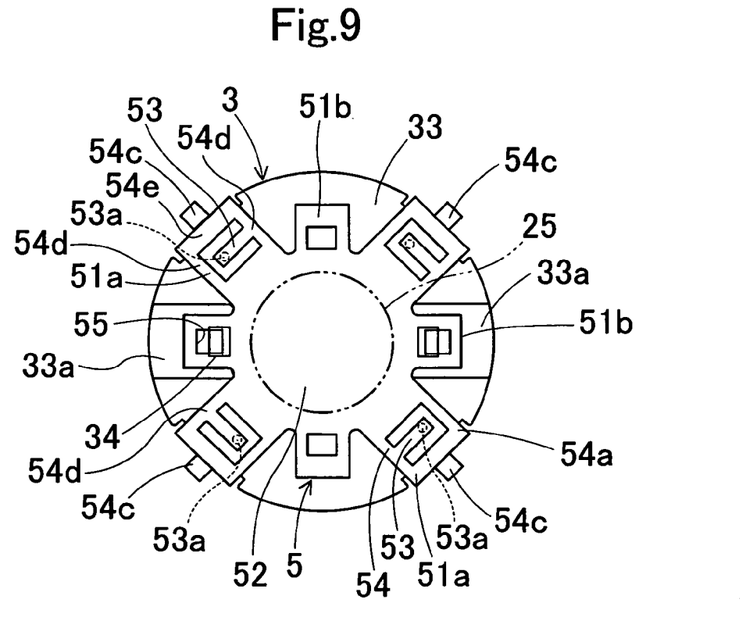
FIG. 9 illustrates a float and shock absorber that make a fuel shutoff valve that is directed to Example No. 4 according to the present invention.

A fuel shutoff valve according to Example No. 4 of the present invention is distinct from the present fuel shutoff valve according to Example No. 1 in that the layout of the second arms 53 is set differently. As illustrated in FIG. 9, the respective second arms 53 are connected at the base end to one of the inner side surfaces of the respective first arms 54. Specifically, the respective first arms 54 are provided with first paired linear sections 54d, 54d, which extend diametrically and faces each other, and a second sections 54e, which extends circumferentially to connect the first paired linear sections 54d, 54d at their diametrically outer ends. The first paired linear sections 54d, 54d, and the second section 54e make the rectangular frame shape of the respective first arms 54, rectangular frame shape which opens in the periphery of the seat 52. The respective second arms 53 are connected at the base end to the center of one of the first paired linear sections 54d, 54d that extend diametrically. The second arms 53 extend linearly from the base end in a direction perpendicular to the diametric direction, namely, in the circumferential direction. To put it differently, the second arms 53 extend parallel to the direction in which the second section 54e of the frame-shaped first arms 54 extends. The leading end of the respective second arms 53 makes a free end that is provided with the contact 53a, which protrudes downward therefrom, on the bottom surface. The other constructions of the present fuel shutoff valve according to Example No. 4 are the same as those of the present fuel shutoff valve according to Example No. 1.

The present fuel shutoff valve according to Example No. 4's second arms 53 operate in the same manner as those of the present fuel shutoff valve according to Example No. 3. That is, the ascending float 3 deforms the second arms 53 upward elastically.

The setting or layouts of the second arms 53, that are directed to the present fuel shutoff valves according to Example Nos. 3 and 4, are applicable not only to the present fuel shutoff valve according to Example No. 1 but also to the present fuel shutoff valve according to Example No. 2. If such is the case, the second arms 53 undergo upward elastic deformation, in the same manner as the second arms 53 that are directed to the present fuel shutoff valve according to Example No. 2, when the float 3 has fully ascended. As a result, the second arms 53 reduce impact noises that might occur when the float 3's seat 36 comes in contact with the casing 2's seal 25.

Example Nos. 1 and 2 comprise the frame-shaped first arms 54 that surround the second arms 53. However, it is allowable that the second arms 53 can be put in place outside the frame-shaped first arms 54 so that they are not surrounded by the first arms 54. For example, it is permissible that the frame-shaped first arms 54, and the second arms 53 can be connected to different circumferential parts of the seat 52, that is, they can be disposed alternately one after another in the circumferential direction. Moreover, it is allowable that the first arms 54 cannot make a frame but can simply extend outward diametrically.

In Example Nos. 1 through 4, the shock absorber 5 comprises the second arms 53 that are provided with the contact 53a. The contacts 53a projects downward so that they come in contact with the float 3's flat top wall 33. However, it is allowable that the contacts 53a can be made flat, and that the float 3's top wall 33 can be provided with convex-shaped bosses. That is, it is allowable as well that the shock absorber 5's flat contacts 53a can come in contact with the float 3's convex-shaped bosses.

In Example Nos. 1 through 4, the shock absorber 5 comprises the first arms 54 that are provided with the locker 54c at the leading end. The lockers 54c are formed as a claw shape that projects toward a diametrically outer side so that they lock to the guide holes 26 or holes 28 that are formed in the casing 2's side wall 21. However, the following is permissible: the shock absorber 5's first arms 54 can be provided with a guide hole or hole, which works as a locker, at the leading end; and the casing's side wall 2 can be provide with a claw that projects toward a diametrically inner side. In other words, it is permissible as well to lock the casing 2' inwardly projecting claws to the guide holes or holes that are formed in the shock absorber 5's first arms 54.

In Example Nos. 1 through 4, the shock absorber 5 comprises the openings 55 that work as engagees. The openings 55 engage with the hooks 34, that is, engagers, which the upwardly protruding protrusions 35 of the float 3 are provided with at the leading or free end. However, it is allowable that the shock absorber 5 can comprise protrusions that protrude downward and have a claw, which works as an engager, at the leading or free end; and that the float can comprise a top wall 33 that is provided with openings. To put it differently, it is allowable as well that the claws of the shock absorber 5's downwardly protruding protrusions can engage with the float 3's openings.

Having now fully described the present invention, it will be apparent to one of ordinary skill in the art that many changes and modifications can be made thereto without departing from the spirit or scope of the present invention as set forth herein including the appended claims.

What is claimed is:

1. A fuel shutoff valve being mounted on the top of fuel tank, and opening and closing a connector passage that connects the inside of the fuel tank to the outside, thereby communicating the inside of the fuel tank with the outside and shutting off the inside of the fuel tank from the outside, the fuel shutoff valve comprising:
   a valve chamber for communicating the connector passage with the inside of the fuel tank;
   a casing comprising a body for forming the valve chamber, a cylinder being disposed on an upper side of the body and protruding into the valve chamber to form the connector passage, and a seal being disposed at a lower end of the cylinder;
   a float being accommodated in the valve chamber, comprising an engager, and ascending and descending within the valve chamber, depending on a buoyant force that results from a liquid-fuel level within the valve chamber to exert on the float; and
   a shock absorber being disposed between the seal of the casing and the float, comprising an engagee that engages with the engager of the float when the float descends at least, and a seat that attaches to and detaches from the seal of the casing, and the shock absorber ascending and descending along with the float within the valve chamber to attach and detach the seat to and from the seal, thereby closing and opening the connector passage;
   the shock absorber further comprising:
   the seat being disposed at a diametrically central part of the shock absorber;

the engagee being disposed on a diametrically outer side of the seat;
a first arm protruding toward a diametrically outer side of the seat, and exhibiting elasticity;
a second arm protruding from one of the first arm and the seat, having a leading end that makes a free end, and exhibiting elasticity;
a contact being disposed at the leading end of the second arm, and coming in contact with the ascending float; and
a locker being disposed at a diametrically-outer-side leading end of the first arm, and locking to the body of the casing when the shock absorber is positioned at the lowermost level in the valve chamber.

2. The fuel shutoff valve according to claim 1, wherein:
the shock absorber further comprises a top wall having an upper surface and a lower surface;
the upper surface of the top wall makes the seat; and
the top wall makes:
   the contact that projects from the lower surface of the top wall and is disposed at the diametrically-outer-side leading end of the second arm;
   the second arm that undergoes upward elastic deformation when the ascending float comes in contact with the contact; and
   the first arm that undergoes downward elastic deformation when the descending float locks the locker of the shock absorber to the body of the casing.

3. The fuel shutoff valve according to claim 2, wherein:
the first arm is provided with the locker at a leading end thereof;
the body of the casing is provided with a side wall that has a guide hole for guiding the ascending and descending locker; and
the locker locks to a lower end of the guide hole of the body when the shock absorber is positioned at the lowermost level in the valve chamber.

4. The fuel shutoff valve according to claim 1, wherein:
the first arm is provided with the locker at a leading end thereof;
the body of the casing is provided with a side wall that has a guide hole for guiding the ascending and descending locker; and
the locker locks to a lower end of the guide hole of the body when the shock absorber is positioned at the lowermost level in the valve chamber.

5. The fuel shutoff valve according to claim 1, wherein:
the shock absorber comprises the first arm, and the second arm that make a dual-structured major arm in which the first arm protrudes from the seat toward a diametrically outer side and then back toward a diametrically inner side so as to go around the second arm without making any contact with the second arm; and
the shock absorber further comprises a minor arm that is connected to one of opposite roots of the first arm and is provided with the engagee, thereby deforming the first arm downward elastically by way of the minor arm when the engager of the descending float engages with the engagee.

6. The fuel shutoff valve according to claim 5, wherein the shock absorber comprises a plurality of the major arms and minor arms that are disposed alternately in a peripheral direction thereof.

7. The fuel shutoff valve according to claim 2, wherein:
the first arm protrudes as a framed shape toward a diametrically outer side of the seat; and
the first arm surrounds the second arm by way of a slit that is provided between the first arm and the second arm.

8. The fuel shutoff valve according to claim 1, wherein:
the first arm is provided with an extension that faces the body of the casing and extends in an ascending/descending direction of the shock absorber;
the extension has a base end that is connected to the diametrically-outer-side leading end of the first arm that the top wall of the shock absorber makes; and
the extension has a leading end that makes a free end and is provided with the locker.

9. The fuel shutoff valve according to claim 1, wherein the second arm has a base end that is connected to the seat, and the leading end that extends outward diametrically.

10. A fuel shutoff valve being mounted on the top of fuel tank, and opening and closing a connector passage that connects the inside of the fuel tank to the outside, thereby communicating the inside of the fuel tank with the outside and shutting off the inside of the fuel tank from the outside, the fuel shutoff valve comprising:
a valve chamber for communicating the connector passage with the inside of the fuel tank;
a casing comprising a body for forming the valve chamber, a cylinder being disposed on an upper side of the body and protruding into the valve chamber to form the connector passage, and a seal being disposed at a lower end of the cylinder;
a float comprising a seat that attaches to and detaches from the seal of the casing, and an engager, and ascending and descending within the valve chamber, depending on a buoyant force that results from a liquid-fuel level within the valve chamber to exert on the float, thereby attaching the seat to and detaching the seat from the seal of the casing to close and open the connector passage; and
a shock absorber being disposed between the seal of the casing and the float, and being retained to the body of the casing;
the shock absorber comprising:
a through hole opening at a diametrically central part of the shock absorber, thereby enabling the seat of the float to advance and retract therein;
a first arm protruding from a peripheral end of the through hole toward a diametrically outer side of the seat, and exhibiting elasticity;
a second arm protruding from one of the first arm and the through hole, having a leading end that makes a free end, and exhibiting elasticity;
a contact being disposed at the leading end of the second arm, and attaching to and detaching from the float;
a locker being disposed at a diametrically-outer-side leading end of the first arm, and locking to the body of the casing; and
an engagee being disposed on a diametrically outer side with respect to the through hole, and engaging with and disengaging from the engager of the float.

11. The fuel shutoff valve according to claim 10, wherein:
the shock absorber further comprises a top wall having an upper surface and a lower surface;
the top wall makes:
   the contact that projects from the lower surface of the top wall and is disposed at the diametrically-outer-side leading end of the second arm;
   the second arm that undergoes upward elastic deformation when the ascending float comes in contact with the contact; and
   the first arm that undergoes downward elastic deformation when the engagee of the shock absorber engages with the engager of the descending float.

12. The fuel shutoff valve according to claim 11, wherein:
the first arm is provided with the locker at a leading end thereof; and
the body of the casing comprises a side wall that has a guide hole for locking to the locker of the shock absorber.

13. The fuel shutoff valve according to claim 10, wherein:
the first arm is provided with the locker at a leading end thereof; and
the body of the casing comprises a side wall that has a guide hole for locking to the locker of the shock absorber.

14. The fuel shutoff valve according to claim 10, wherein:
the shock absorber comprises the first arm, and the second arm that make a dual-structured major arm in which the first arm protrudes from the seat toward a diametrically outer side and then back toward a diametrically inner side so as to go around the second arm without making any contact with the second arm; and
the shock absorber further comprises a minor arm that is connected to one of opposite roots of the first arm and is provided with the engagee, thereby deforming the first arm downward elastically by way of the minor arm when the engager of the protrusion of the descending float engages with the engagee.

15. The fuel shutoff valve according to claim 14, wherein the shock absorber comprises a plurality of the major arms and minor arms that are disposed alternately in a peripheral direction thereof.

16. The fuel shutoff valve according to claim 10, wherein:
the first arm protrudes as a framed shape toward a diametrically outer side of the seat; and
the first arm surrounds the second arm by way of a slit that is provided between the first arm and the second arm.

17. The fuel shutoff valve according to claim 10, wherein:
the first arm is provided with an extension that faces the body of the casing and extends in an ascending/descending direction of the shock absorber;
the extension has a base end that is connected to the diametrically-outer-side leading end of the first arm that the top wall of the shock absorber makes; and
the extension has a leading end that makes a free end and is provided with the locker.

18. The fuel shutoff valve according to claim 10, wherein the second arm has a base end that is connected to the seat, and the leading end that extends outward diametrically.

* * * * *